G. SCHUSTER.
VALVE.
APPLICATION FILED NOV. 10, 1909.

976,702.

Patented Nov. 22, 1910.

WITNESSES
Edward Thorpe

INVENTOR
Guido Schuster
BY
ATTORNEYS

UNITED STATES PATENT OFFICE.

GUIDO SCHUSTER, OF BESZTĚRCZE, AUSTRIA-HUNGARY.

VALVE.

976,702.   Specification of Letters Patent.   Patented Nov. 22, 1910.

Application filed November 10, 1909. Serial No. 527,224.

*To all whom it may concern:*

Be it known that I, GUIDO SCHUSTER, a subject of the King of Hungary, and a resident of Besztërcze, Austria-Hungary, have invented a new and Improved Valve, of which the following is a full, clear, and exact description.

The invention is an improvement in valves for pneumatic vehicle tires, cushions and other air-inflated articles, and has for its purpose to prevent possible leaking of the air through the valve after the article has been inflated.

To this end I construct the barrel or tubular body through which air is introduced into the article, of an inner and outer section, the outer section threaded into the inner section and having upper and lower external shoulders, a cap threaded on the outer end of the outer section of the tubular body, and a packing seating on each shoulder, with the lower packing forming an air-tight joint between the sections of the tubular body, and the upper packing forming a fluid-tight joint between the outer section of the tubular body and the cap.

Reference is to be had to the accompanying drawings forming a part of this specification, in which similar characters of reference indicate corresponding parts in both views.

Figure 1:
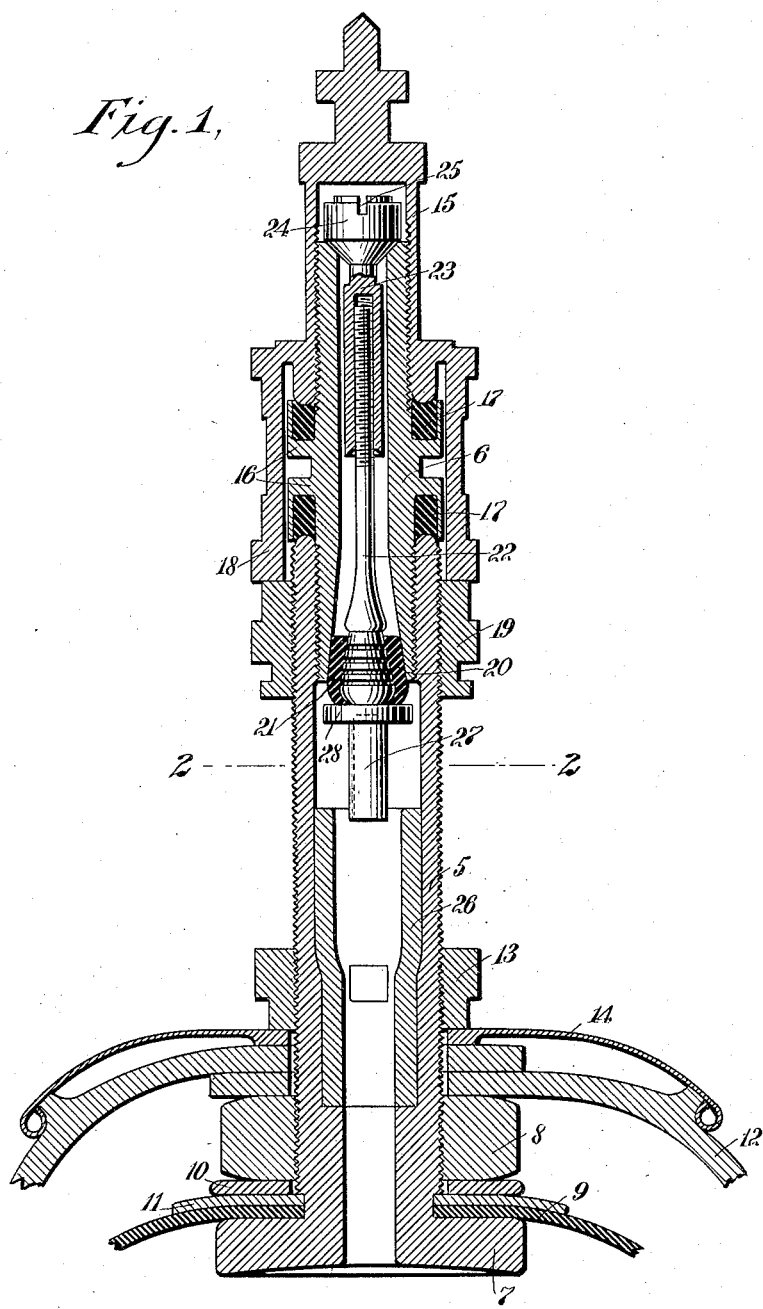
Figure 2:
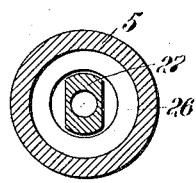

Figure 1 is a central longitudinal section through a valve embodying my invention as applied to the tire of a motor cycle; and Fig. 2 is a cross-section of the same on the line 2—2 of Fig. 1.

The valve embodies in its construction an externally-threaded barrel or tubular body 5, having an inner removable section 6 threaded therein, and provided with a mushroom head 7, between which and a nut 8 threaded on the body, is adapted to be clamped the inner tube 9 of a tire or other air-inflated article, a strong air-tight connection at this point being insured by placing a metal washer 10 directly under the nut, and a rubber washer 11 between the washer 10 and the inner tube. To the upper or outer face of the nut 8 are clamped the overlapping edges of the outer rubber tube 12, by a nut 13 threaded on the tubular body and binding on the rim 14.

The outer removable section 6 of the valve body is externally threaded at its outer end to receive a cap 15, and at or near the center is provided with enlargements or collars 16, the faces of which, respectively adjacent to the cap and inner section 5 of the tubular body, are grooved to receive gaskets 17 of rubber or other suitable material. By this arrangement an air-tight joint is afforded between the two sections of the valve body when the outer section is tightened, and a like joint is provided between the cap and outer section of the tubular body when the cap is tightly threaded to place. The cap 15 is provided with a cylinder 18 of sufficient diameter and length to envelop the joints afforded by the gaskets when the cap is assembled, the inner end of the cylinder bearing on a lock nut 19 threaded on the inner section of the valve body and preventing the cap from working loose.

The inner end of the outer section 6 of the valve body is conically bored to form a seat for a valve 20, the valve having an outer jacket 21 of rubber or other equivalent material to insure the absolute cutting off of the air from the inner tube when the valve is seated, the jacket being securely united with the valve by providing the latter with a number of circumferential grooves into which the rubber projects. The stem 22 of the valve passes outwardly through the outer section 6 of the valve body a substantial distance, where it is threaded into the tubular shank or stem 23 of a valve 24, the latter seating on the outer end of the tube 6 and having a cross slot 25 in its head for the insertion of a screw-driver in drawing the two valves together or removing the outer valve from the tube. The inner section of the tubular body 5 is counterbored for the greater portion of its length and receives a bushing 26, the bore of which forms a guide for an extension piece 27 rigid with the valve 20, the said piece being flattened at each side, as best shown in Fig. 2, in order that it may not substantially interfere with the passage of the air into the inner tube when the latter is being inflated. A head or collar 28 is formed on the extension piece 27 and is adapted to seat on the outer end of the bushing 26 and limit the inner movement of the valve 20.

In inflating the tire or other article to which the valve is applied, the cap is first removed, after which the valve 24 is unscrewed and withdrawn. A pump hose is then applied to the outer threaded end of the tube 26, as is the usual practice, and the inflation of the tire proceeded with. The air as it is introduced into the tube is prevented from escaping by reason of the seating of the valve 20 under the air pressure from within. After the inflation is completed the valve 24 is re-applied and tightened to forcibly draw it and the valve 20 to their respective seats, forming an air-tight joint at both points. A further air-tight joint is effected when the cap is applied, thus sealing the valve at three different places.

Having thus described my invention, I claim as new and desire to secure by Letters Patent:

1. In a valve for air-inflated articles, a tubular body through which the air is introduced into the article, constructed of two sections, the outer section threaded into the inner section and having an intermediate portion provided with annular grooves on the inner and outer faces thereof, each groove having a packing, with the packing of the inner groove forming an air-tight joint between the two sections of the body, and a cap threaded on the outer end of the outer section of the body and forming an air-tight joint with the outer packing.

2. In a nozzle for air-inflated articles, a tubular body through which the air is introduced in inflating the article, having an outer removable section threaded therein, with the outer section provided with an intermediate enlargement having an annular groove in the outer and inner faces thereof, packings within said grooves, with the packing of the inner groove forming an air-tight joint between the two sections of the body, and a cap threaded on the outer end of the tubular section of the body and forming an air-tight joint with the outer packing and having a cylinder projecting therefrom, inclosing the said enlargement.

3. In a nozzle for air-inflated articles, a tubular body through which the air is introduced in inflating the article, having an outer removable section threaded therein, with the outer section provided with an intermediate enlargement having an annular groove in the outer and inner faces thereof, packings within said grooves, with the packing of the inner groove forming an air-tight joint between the two sections of the body, a cap threaded on the outer end of the tubular section of the body and forming an air-tight joint with the outer packing and having a cylinder projecting therefrom, inclosing the said enlargement, and a jam-nut threaded on the inner section of the tubular body and adapted to bind on the inner end of the cylinder.

4. In a valve for air-inflated articles, a tubular body through which the air is introduced into the article, constructed of an inner and an outer section, the outer section threaded into the inner section and having upper and lower external shoulders, a cap threaded on the outer end of the outer section of the tubular body, and a packing seating on each shoulder, with the lower packing forming an air-tight joint between the sections of the tubular body, and the upper packing forming a fluid-tight joint between the outer section of the tubular body and the cap.

5. In a valve for air-inflated articles, a tubular body through which the air is introduced into the article, constructed of an inner and an outer section threaded together, and a cap threaded on the outer end of the outer section, the outer section having externally-arranged packings respectively forming a fluid-tight joint between the sections of the body and the outer section of the body and the cap.

6. In a valve for air-inflated articles, a tubular body through which the air is introduced into the article, constructed of an inner and an outer section threaded together, the outer section having a valve to prevent the escape of the air, and a cap threaded on the outer end of the outer section, the outer section having externally-arranged packings respectively forming fluid-tight joints between the sections of the body and the outer section of the body and the cap, and the cap having a portion extending therefrom and enveloping the said packings.

In testimony whereof I have signed my name to this specification in the presence of two subscribing witnesses.

GUIDO SCHUSTER.

Witnesses:
 KOUDOR BERNAT,
 TOTH ISTRANZ.